Feb. 18, 1969  V. ERICKSON  3,428,296
SAFETY COVER FOR VALVES
Filed Jan. 12, 1966
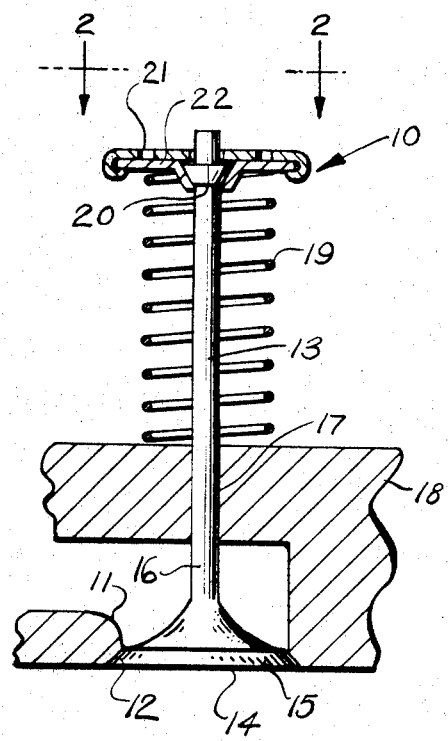
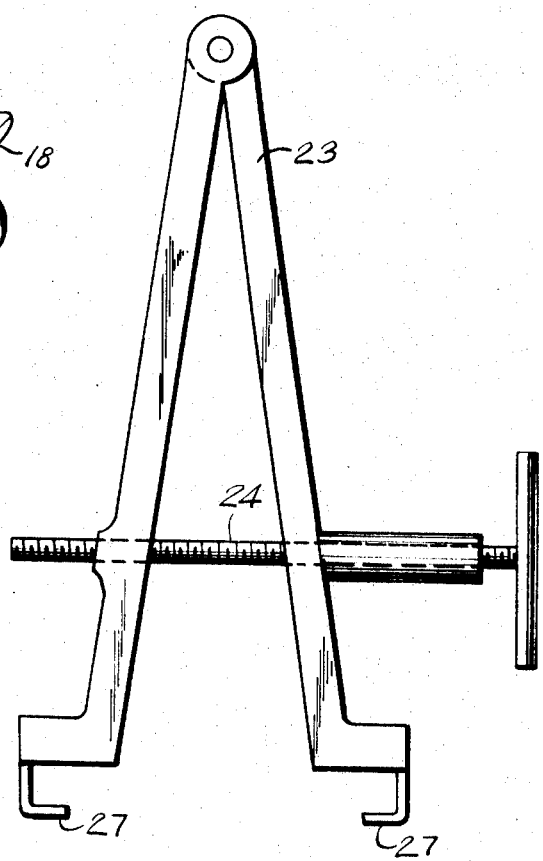
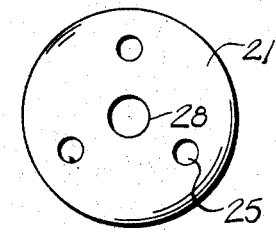
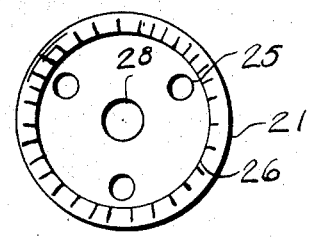
INVENTOR.
Victor Erickson

United States Patent Office 3,428,296
Patented Feb. 18, 1969

3,428,296
SAFETY COVER FOR VALVES
Victor Erickson, 757 W. Marine Drive,
Astoria, Oreg. 97103
Filed Jan. 12, 1966, Ser. No. 520,292
U.S. Cl. 251—337     3 Claims
Int. Cl. F16k 17/04, 7/12

ABSTRACT OF THE DISCLOSURE

A valve safety cap securable over a valve circular spring retainer plate so to prevent the valve components from dropping down into the engine cylinder in case of breakage or damage of the valve spring, the safety cap comprising a circular member having a peripheral edge which is crimped around the underside of the retainer plate.

---

This invention relates to valve covers, and more particularly to a safety cover for valves.

It is therefore the main purpose of this invention to provide a safety cover for valves which securely holds the valve in a stationary position in case of breaking or damage to the valve spring.

Another object of this invention is to provide a safety cover for valves which prevents the retainer plate from dropping into the cylinder wall and damaging it.

Another object of this invention is to provide a safety cover for valves wherein a valve safety cap may be superimposed on the spring retainer plate by means of a crimping tool.

Another object of this invention is to provide a safety cover for valves which is easy to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a side view of a valve incorporating this invention;

FIGURE 2 is a view taken along the lines 2—2 of FIG. 1;

FIGURE 3 is a bottom plan view of FIGURE 2; and

FIGURE 4 is a side elevational view of the crimping tool used to install the valve cover.

According to this invention, a safety cover for valves 10 is provided for valve 13 which includes stem 16 and a valve head 14. Engine part 18 is provided with an escape port 11, the bottom part of which includes a valve seat 12 which is adapted to correspond with valve seating face 15 of valve head 14. Stem 16 is guided within stem guiding hole 17. Valve spring 19 is enclosing stem 16, and the bottom part thereof is adapted to be supported on engine part 18. At the top portion of stem 16 and spring 19 spring retainer plate 22 secures top portion of spring 19 and stem 16 by means of retainer lock 20. Crimping tool 23 having manually operable screw 24 and metallic jaws 27 is provided for crimping valve safety cap 21 on the peripheral portion of the circular spring retainer plate 22. Cap 21 and plate 22 are provided with hole 28 for admitting the top portion of stem 16 therein. The openings 25 are for receiving cap screws for oversized associate parts.

It will also be noted that valve safety cap 21 is adapted to hold spring retainer plate 22 at a pre-determined distance thereby preventing cylinder cover from being damaged in case of breaking of valve spring 19.

What I now claim is:

1. A safety cover for valves comprising a valve member, a circular retainer plate for securing said member, a cylinder casing having at least one valve seat with an exhaust port and a guiding opening therein, said valve member adapted to be positioned within said seat and said guiding opening, a spring member enclosing a portion of said valve member and being positioned between said cylinder casing and said retainer plate, a securing member at the top portion of said valve member for securing and positioning said retainer plate to said valve member, and a circular valve safety cap secured on said retainer plate by means of a peripheral crimp on the periphery of said valve safety cap, said crimp enclosing around the peripheral edge of said retainer plate and thereby providing locking means for said valve member when said member is secured within said valve safety cap at a predetermined distance, said valve safety cap being provided with a central opening for admitting the stem of said valve member, and said cap being provided with a plurality of auxiliary openings evenly spaced from one another for optional safety precautions, said auxiliary openings being adapted for cap screws for oversized associate parts.

2. Safety cover according to claim 1, wherein said valve member includes a valve head, a stem integrally connected with said head, said stem extending outwardly from said cylinder casing and being adapted to move within said guiding hole of said cylinder casing.

3. Safety cover according to claim 1, wherein said spring member is a metallic spring of helical configuration and being adapted to provide resilient force to said valve member.

References Cited

UNITED STATES PATENTS

| 1,420,898 | 6/1922 | Willey | 251—337 |
| 1,457,957 | 6/1923 | Birkigt | 251—337 XR |
| 1,460,538 | 7/1923 | Easton | 251—337 |
| 1,684,745 | 9/1928 | Roberts | 251—337 |
| 1,711,267 | 4/1929 | Hutt | 251—337 XR |
| 2,142,224 | 1/1939 | Turlay | 251—337 XR |
| 2,470,327 | 5/1949 | Tener | 251—337 XR |
| 2,516,795 | 7/1950 | Norton | 251—337 XR |
| 2,780,071 | 2/1957 | Calva | 137—612.1 XR |

SAMUEL SCOTT, *Primary Examiner.*